United States Patent
Lai et al.

(10) Patent No.: US 9,107,141 B2
(45) Date of Patent: Aug. 11, 2015

(54) SELECTION METHOD FOR RAPIDLY OBTAINING HOTSPOT INFORMATION

(71) Applicant: D-Link Corporation, Taipei (TW)

(72) Inventors: Jui-Wen Lai, Taipei (TW); Ming-Han Liu, Taipei (TW)

(73) Assignee: D-LINK CORPORATION, Taipei (TW)

( * ) Notice: Subject to any disclaimer, the term of this patent is extended or adjusted under 35 U.S.C. 154(b) by 115 days.

(21) Appl. No.: 14/078,834

(22) Filed: Nov. 13, 2013

(65) Prior Publication Data
US 2015/0055505 A1 Feb. 26, 2015

(30) Foreign Application Priority Data
Aug. 20, 2013 (TW) .............................. 102129767 A

(51) Int. Cl.
*H04L 12/28* (2006.01)
*H04W 48/14* (2009.01)
*H04W 4/12* (2009.01)

(52) U.S. Cl.
CPC ................ *H04W 48/14* (2013.01); *H04W 4/12* (2013.01)

(58) Field of Classification Search
CPC ................................. H04W 48/14; H04W 4/12
USPC ....................................................... 370/254
See application file for complete search history.

(56) References Cited

U.S. PATENT DOCUMENTS

| 2002/0129027 | A1* | 9/2002 | Cameron et al. ............... 707/10 |
| 2006/0221917 | A1* | 10/2006 | McRae ........................ 370/338 |
| 2012/0044862 | A1* | 2/2012 | Chen et al. ................... 370/328 |
| 2013/0167196 | A1* | 6/2013 | Spencer et al. .................. 726/3 |
| 2013/0212656 | A1* | 8/2013 | Ranade et al. .................... 726/6 |
| 2013/0297730 | A1* | 11/2013 | Zhang et al. .................. 709/217 |
| 2015/0074768 | A1* | 3/2015 | Levi ............................. 726/4 |
| 2015/0092676 | A1* | 4/2015 | Periyalwar et al. ........... 370/329 |

* cited by examiner

*Primary Examiner* — Chi H Pham
*Assistant Examiner* — Robert Lopata
(74) *Attorney, Agent, or Firm* — Bacon & Thomas, PLLC

(57) ABSTRACT

The present invention is to provide a selection method for rapidly obtaining hotspot information, which is applicable to a wireless communication system including at least one mobile terminal device capable of performing a site survey and transmitting a probe request, a plurality of wireless hotspot devices each capable of receiving the probe request, reading a terminal identifier in the probe request and sending the terminal identifier out, and a server of a telecommunication company capable of receiving the terminal identifier. After receiving the terminal identifier, the server compares the terminal identifier against user data in a user database and then sends a text message to the mobile terminal device when determining that the terminal identifier is already registered in the user database, wherein the text message includes SSID and password of a wireless hotspot device to which the mobile terminal device can currently choose to connect for interconnecting the Internet.

12 Claims, 3 Drawing Sheets

SELECTION METHOD FOR RAPIDLY
OBTAINING HOTSPOT INFORMATION

FIELD OF THE INVENTION

The present invention relates to a method for obtaining hotspot information, more particularly to a selection method for rapidly obtaining hotspot information, which is applicable to a wireless communication system including at least one mobile terminal device capable of performing a site survey and transmitting a probe request, a plurality of wireless hotspot devices each capable of receiving the probe request, reading a terminal identifier in the probe request and sending the terminal identifier out, and a server of a telecommunication company capable of receiving the terminal identifier. After receiving the terminal identifier, the server compares the terminal identifier against user data in a user database and then sends a text message to the mobile terminal device when determining that the terminal identifier is already registered in the user database, wherein the text message includes SSID and password of a wireless hotspot device to which the mobile terminal device can currently choose to connect. Thus, the user can easily obtain the hotspot information of a nearby wireless hotspot device without having to bear in mind the long SSID and password, and the mobile terminal device can rapidly connect to the nearby wireless hotspot device and, through the connection services of the wireless hotspot device, connect to the Internet in a fast, convenient, and stable manner.

BACKGROUND OF THE INVENTION

A so-called "wireless network" uses radio waves as the signal transmission medium. In Taiwan, the most widely used wireless network signals nowadays are Wi-Fi signals and 3G signals, so mobile terminal devices (e.g., smart phones and tablet personal computers) are typically equipped with a wireless module configured for receiving these two types of signals.

The Wi-Fi and 3G technologies are briefly summarized as follows. Wi-Fi, which is based on the IEEE 802.11 standard, features low-cost and easy installation and is therefore extensively applied to the creation of wireless network environments in schools, enterprises, and government institutions. As Wi-Fi signals have a transmission range of only 100 meters or so, it is common practice for service providers to set up "hotspots" in places which are generally crowded (e.g., airports, train stations, coffee shops, and libraries). One who carries a mobile terminal device capable of receiving Wi-Fi signals and enters the radio signal transmission range of a "hotspot" can readily connect to the Internet through the "hotspot".

On the other hand, 3G stands for "the third generation of mobile telecommunications technology" and supports cellular mobile communication for high-speed data transfer (i.e., the IMT-2000, or International Mobile Telecommunications-2000, specifications). 3G can be used to integrate wireless communication with the Internet and other multimedia communication technologies in order to deal with image, music, and video data and provide such services as webpage browsing, teleconference, and electronic commerce. As 3G enables high-speed download, and with the increasing prevalence of smart phones and tablet personal computers, 3G signals are now commonly used in wireless network connection, and because of that, 3G networks are frequently overloaded, which leads to low service quality and customer complaints.

To overcome this problem, most mobile terminal devices are designed to be switchable between Wi-Fi signals and 3G signals, and in light of this, many telecommunication service providers try to divert data flow from 3G networks by deploying a large number of "hotspots", which allow 3G users to connect to the Internet through Wi-Fi signals instead. While this diversion scheme can effectively reduce the number of mobile terminal devices using 3G networks, the following problem arises. As is well known in the art, one who wishes to use the network services of a "hotspot" must select the service set identifier (SSID) of a currently available "hotspot" and input the corresponding password in order to connect to that specific "hotspot" and use its network services. However, this operation can be difficult to perform because a mobile terminal device can often find a good number of SSIDs, which are not necessarily the SSIDs of "hotspots" but also include the SSIDs of private wireless networks. As the list of access points available to a mobile terminal device (i.e., the list showing the SSIDs) tends to be extremely long, the user of the mobile terminal device may have problem identifying and selecting the SSID available for use. This may in turn reduce the user's willingness to use "hotspots", and the user may keep using the 3G services simply to avoid the trouble stated above. If this problem persists, the aforesaid diversion scheme will eventually fail.

Therefore, it has been an important goal in the related industries to find an effective solution to the foregoing problem so that one can rapidly and conveniently obtain the information of a "hotspot" and connect a mobile terminal device to the "hotspot".

BRIEF SUMMARY OF THE INVENTION

As stated above, one who wishes to access the services of a nearby "hotspot" using a mobile terminal device is required to identify and select from among a large number of SSIDs the SSID of that "hotspot" and input the corresponding password, and yet the required operation is inconvenient. In view of this, and in order to effectively solve the aforementioned problem, the inventor of the present invention conducted extensive research and experiment and finally succeeded in developing a selection method for rapidly obtaining hotspot information.

It is an object of the present invention to provide a selection method for rapidly obtaining hotspot information. The selection method is applicable to a wireless communication system which includes at least one mobile terminal device, a plurality of wireless hotspot devices, and a server of a telecommunications company. The mobile terminal device can connect to the wireless hotspot devices, and each wireless hotspot device can connect to the server. The server is provided with a user database containing at least one entry of user data. The selection method includes the following steps to be performed by the wireless communication system after the mobile terminal device starts its wireless network connection function. To begin with, the mobile terminal device performs a site survey and transmits a probe request in a predetermined frequency band (e.g., 2.4 GHz~5 GHz). Then, each wireless hotspot device receives the probe request, reads the terminal identifier (e.g., the media access control, or MAC, address of the mobile terminal device) in the probe request, and sends the terminal identifier to the server. Once receiving the terminal identifier, the server compares the terminal identifier against the user data in the user database in order to determine whether the terminal identifier is already registered in the database (i.e., whether the terminal identifier corresponds to a legitimate user). If yes, the server sends a text message to the mobile terminal device, wherein the text message includes the SSID and the password of a wireless hotspot device to which the mobile terminal device can currently choose to connect (the SSID and the password are hereinafter collectively referred to as hotspot information). After the user of the mobile terminal device manually inputs the hotspot information in the text message into the mobile terminal device, or after the mobile terminal device automatically reads the hotspot information from the text message, the mobile terminal device connects to the wireless hotspot device corresponding to the SSID and the password, according to the SSID and the password. Thus, the user can easily obtain the hotspot information of a nearby wireless hotspot device without having to bear in mind the long SSID and password, and the mobile terminal device can rapidly connect to the nearby wireless hotspot device and, through the connection services of the wireless hotspot device, connect to the Internet in a fast, convenient, and stable manner.

BRIEF DESCRIPTION OF THE SEVERAL VIEWS OF THE DRAWINGS

The objects, as well as the technical features and effects thereof, of the present invention will be best understood by referring to the following detailed description of some illustrative embodiments in conjunction with the accompanying drawings, in which.

DETAILED DESCRIPTION OF THE INVENTION

Figure 1:
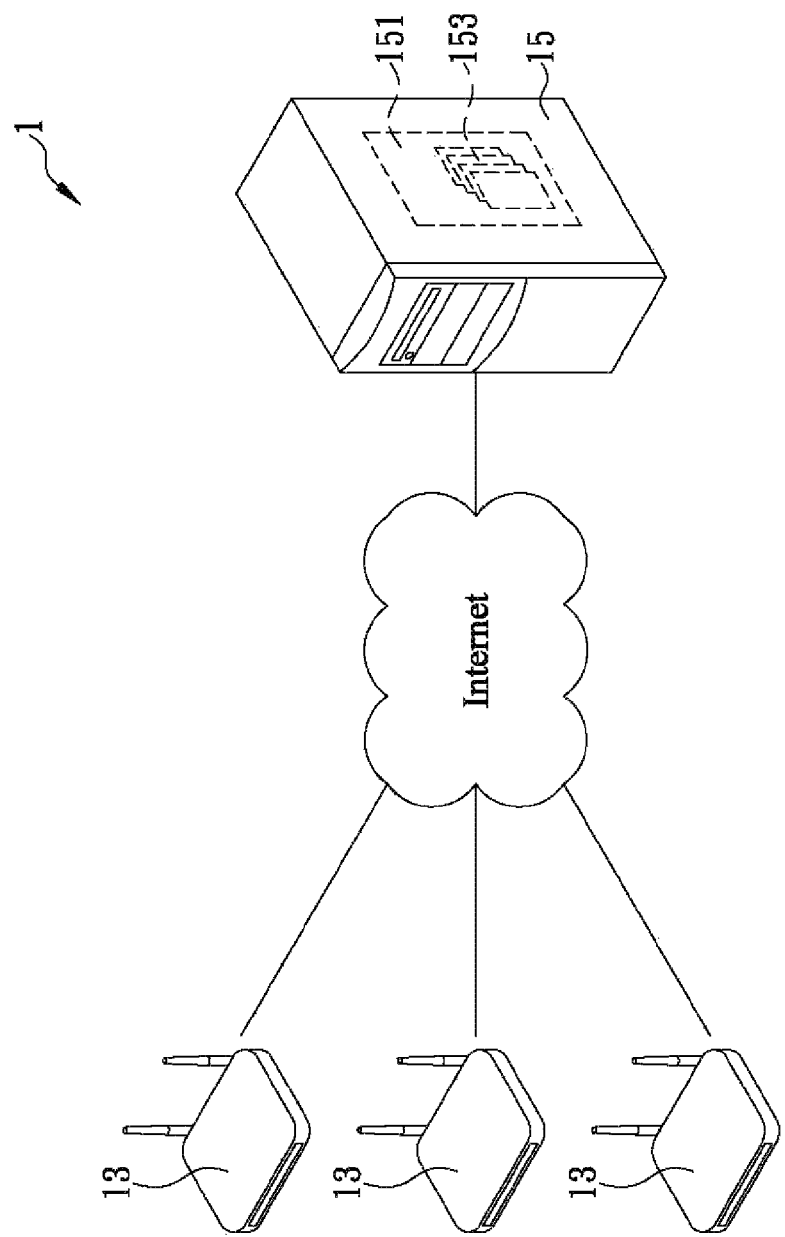
FIG. 1 schematically shows the structure of a wireless communication system to which the present invention is applied.

The present invention provides a selection method for rapidly obtaining hotspot information, wherein the selection method is applicable to a wireless communication system. In one embodiment as shown in FIG. 1, the wireless communication system includes at least one mobile terminal device 11, a plurality of wireless hotspot devices 13, and a server 15 of a telecommunications company. The mobile terminal device 11 may be a smart phone, a tablet personal computer, a personal digital assistant, or the like. The mobile terminal device 11 is configured for receiving mobile communication signals (e.g., 3G signals, 3.5G signals) and wireless local area network (wireless LAN) signals (e.g., Wi-Fi signals) and can switch between mobile communication signals and wireless LAN signals in order to access network services using either type of signals.

Referring to FIG. 1, the mobile terminal device 11 is also configured for connecting to the wireless hotspot devices 13 via wireless LAN signals, and each wireless hotspot device 13 can connect to the Internet through wireless signals or physical lines and thereby connect to the server 15. The server 15 is provided with a user database 151. The user database 151 contains at least one entry of user data 153, wherein the user data 153 are a record of information related to a specific user (e.g., name, address) and of information corresponding to the user's mobile terminal device 11 (e.g., phone number, MAC address).

Referring to FIG. 1, after the user starts the wireless network connection function of the mobile terminal device 11, the mobile terminal device 11 performs a site survey, during which the mobile terminal device 11 transmits a probe request in a predetermined frequency band (e.g., 2.4 GHz~5 GHz) over the area where the mobile terminal device 11 is located. The probe request includes the terminal identifier of the mobile terminal device 11 (e.g., the MAC address of the mobile terminal device) and may include other information (e.g., a phone number, information of the current location of the mobile terminal device 11). Each wireless hotspot device 13 receives the probe request and reads the terminal identifier therein (e.g., the MAC address of the mobile terminal device), before sending the terminal identifier to the server 15. It should be pointed out that, in addition to the terminal identifier, each wireless hotspot device 13 may send other information to the server 15 for verification by the server 15.

Referring again to FIG. 1, the server 15, once receiving the terminal identifier, compares the terminal identifier against the user data 153 in the user database 151 in order to determine whether the terminal identifier is already registered in the user database 151. If yes, meaning the mobile terminal device 11 is a legitimate user, the server 15 sends a text message to the mobile terminal device 11. The text message contains such hotspot information as the SSID and the corresponding password of the (or each) wireless hotspot device 13 that the mobile terminal device 11 can currently choose to connect to. It should be pointed out that the hotspot information sent from the server 15 may include only one set of SSID and the corresponding password or plural sets of SSIDs and the corresponding passwords. The server 15 can select the hotspot information of the wireless hotspot device(s) 13 available to the mobile terminal device 11 either according to the location of each wireless hotspot device 13 from which the terminal identifier is sent, or according to the information of the current location of the mobile terminal device 11 (hereinabove referred to as "other information"). In other embodiments of the present invention, the server 15 may directly send the hotspot information-containing text message to the mobile terminal device 11 without verifying whether the mobile terminal device 11 is a legitimate user.

Referring again to FIG. 1, after receiving the text message, the mobile terminal device 11 can connect to the (or a) currently available wireless hotspot device 13 in the following two ways in order to access the services provided by the wireless hotspot device 13:

(1) The first way is for the user to check the text message by themselves and manually input the hotspot information into the mobile terminal device 11 via an input unit 111 (e.g., a touch screen, keys) of the mobile terminal device 11. Based on the SSID and the password thus input, the mobile terminal device 11 will connect to the wireless hotspot device 13 corresponding to the SSID and the password.

(2) The second way is for the mobile terminal device 11 to automatically read the hotspot information in the text message. If there is only one set of SSID and password, the mobile terminal device 11 will, based on the SSID and the password, connect to the wireless hotspot device 13 corresponding to the SSID and the password. If there are plural sets of SSIDs and passwords, the mobile terminal device 11 will select one set of SSID and password, either randomly or according to the signal strength of each corresponding wireless hotspot device 13, and connect to the wireless hotspot device 13 corresponding to the selected SSID and password.

Figure 2A:
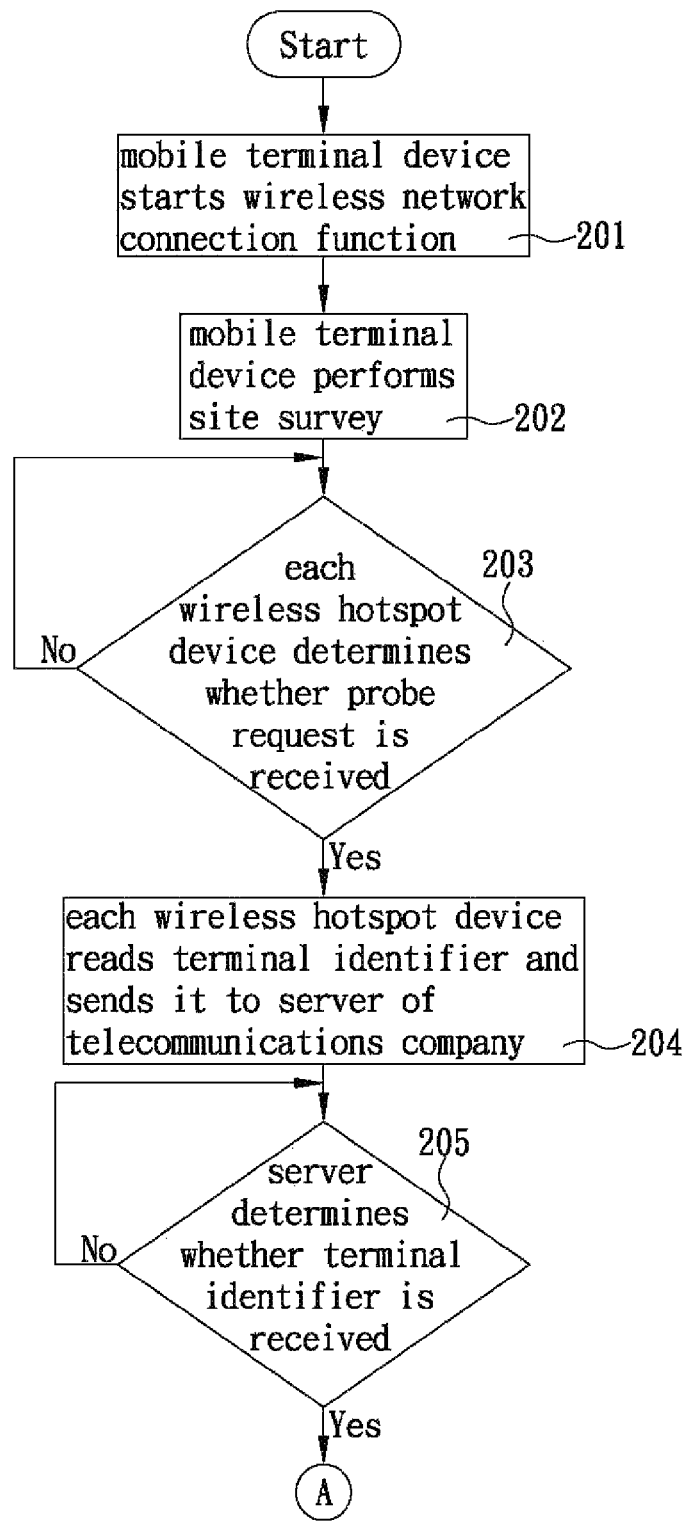
FIG. 2A shows a part of the flowchart of the present invention.
Figure 2B:
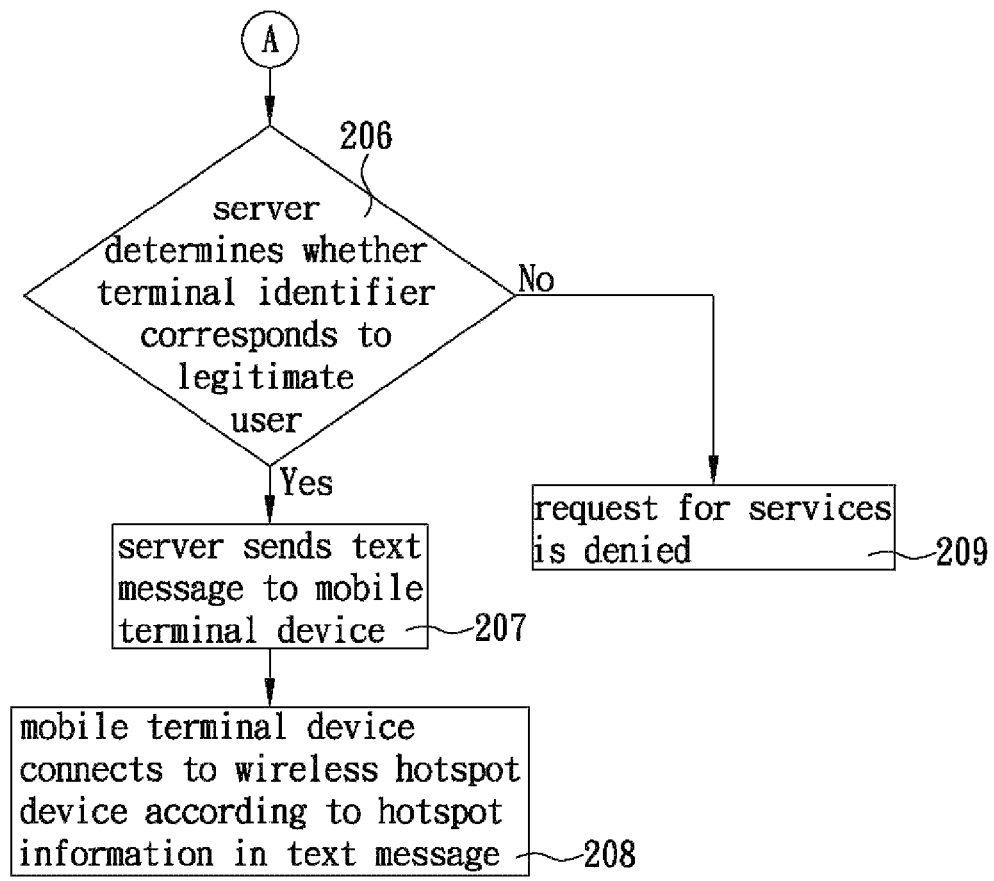
FIG. 2B shows the remaining part of the flowchart of the present invention.

To specifically disclose the steps of the foregoing process, the operation of the wireless communication system 1 is detailed below with reference to FIGS. 2A and 2B in conjunction with FIG. 1:

(201) The mobile terminal device 11 starts its wireless network connection function. Then, step (202) is performed.

(202) The mobile terminal device 11 performs a site survey and transmits a probe request. Then, step (203) is performed.

(203) Each wireless hotspot device 13 determines whether the probe request is received. If yes, go to step (204); otherwise, return to step (203).

(204) Each wireless hotspot device 13 having received the probe request reads the terminal identifier in the probe request and sends the terminal identifier to the server 15 of the telecommunications company. The process continues to step (205).

(205) The server 15 determines whether the terminal identifier is received. If yes, go to step (206); otherwise, return to step (205).

(206) Based on the user data 153 in the user database 151, the server 15 determines whether the terminal identifier corresponds to a legitimate user. If yes, go to step (207); otherwise, go to step (209).

(207) The server 15 sends a text message to the mobile terminal device 11. The process goes on to step (208).

(208) According to the hotspot information in the text message, the mobile terminal device 11 connects to the corresponding wireless hotspot device 13.

(209) The request for services is denied.

In short, referring back to FIG. 1, the method of the present invention is so designed that the user of the mobile terminal device 11 no longer has to determine which SSIDs in the list of access points available to the mobile terminal device 11 correspond to the wireless hotspot devices 13 and which SSIDs correspond to private wireless networks. It is also unnecessary for the user to memorize long SSIDs and passwords. With the present invention, the user can conveniently obtain the hotspot information of the wireless hotspot devices 13 in the area where the user is located, so as for the mobile terminal device 11 to rapidly connect to a wireless hotspot device 13 in the area and use the connection services of the wireless hotspot device 13 to connect to the Internet in a fast, convenient, and stable manner.

While the invention herein disclosed has been described by means of specific embodiments, numerous modifications and variations could be made thereto by those skilled in the art without departing from the scope of the invention set forth in the claims.

What is claimed is:

1. A selection method for rapidly obtaining hotspot information, the selection method being applicable to a wireless communication system, the wireless communication system including at least one mobile terminal device, a plurality of wireless hotspot devices, and a server of a telecommunications company, wherein the mobile terminal device is connectable to the wireless hotspot devices, and each said wireless hotspot device is connectable to the server, the selection method comprising the steps, to be performed by the wireless communication system after the mobile terminal device starts a wireless network connection function, of:

performing a site survey and transmitting a probe request, by the mobile terminal device;

receiving the probe request, reading a terminal identifier in the probe request, and sending the terminal identifier to the server, by each said wireless hotspot device;

sending a text message to the mobile terminal device, by the serve after receiving the terminal identifier, wherein the text message comprises a service set identifier (SSID) and a password which correspond to a said wireless hotspot device the mobile terminal device currently can choose to connect to; and connecting to the wireless hotspot device corresponding to the SSID and the password, by the mobile terminal device according to the SSID and the password.

2. The selection method of claim 1, wherein the server is provided with a user database, and the user database contains at least one entry of user data, the selection method further comprising the steps, to be performed by the server after receiving the terminal identifier and before sensing the text message to the mobile terminal device, of: comparing the terminal identifier against the user data in the user database; and sending the text message to the mobile terminal device upon determining that the terminal identifier is already registered in the user database.

3. The selection method of claim 2, wherein the mobile terminal device automatically reads the SSID and the password in the text message after receiving the text message.

4. The selection method of claim 2, wherein the mobile terminal device passively receives the SSID and the password from an input unit of the mobile terminal device after receiving the text message.

5. The selection method of claim 1, wherein the mobile terminal device transmits the probe request in a predetermined frequency band.

6. The selection method of claim 2, wherein the mobile terminal device transmits the probe request in a predetermined frequency band.

7. The selection method of claim 3, wherein the mobile terminal device transmits the probe request in a predetermined frequency band.

8. The selection method of claim 4, wherein the mobile terminal device transmits the probe request in a predetermined frequency band.

9. The selection method of claim 5, wherein the terminal identifier is a media access control (MAC) address of the mobile terminal device.

10. The selection method of claim 6, wherein the terminal identifier is a media access control (MAC) address of the mobile terminal device.

11. The selection method of claim 7, wherein the terminal identifier is a media access control (MAC) address of the mobile terminal device.

12. The selection method of claim 8, wherein the terminal identifier is a media access control (MAC) address of the mobile terminal device.

* * * * *